INVENTOR
ERIC LAIMINS
BY,
Dike, Thompson, Bronstein & Mrose
ATTORNEYS

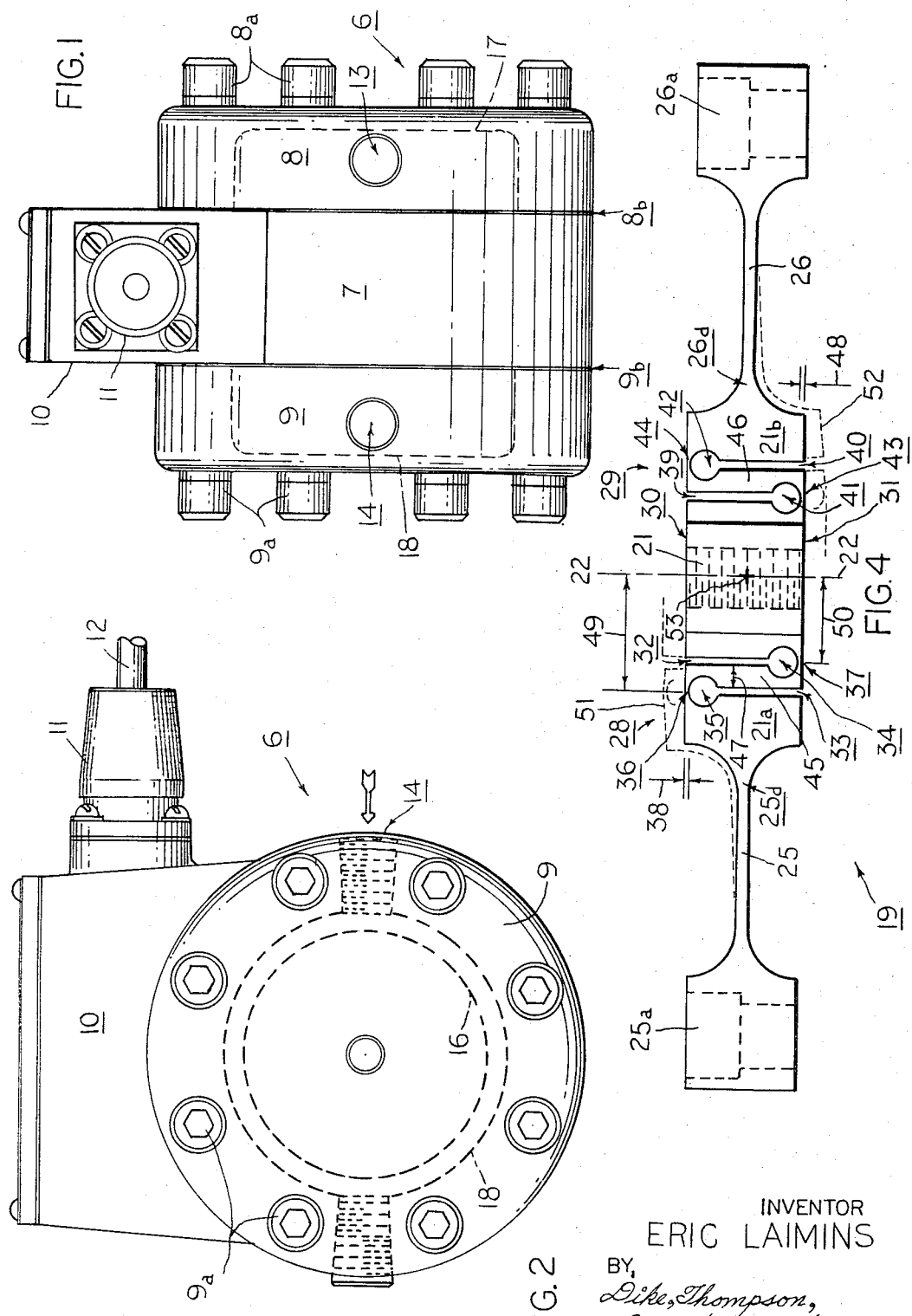
Jan. 16, 1968   E. LAIMINS   3,363,456
CANTILEVER BEAM TRANSDUCERS
Filed Feb. 2, 1965   2 Sheets-Sheet 1
INVENTOR
ERIC LAIMINS
BY,
Dike, Thompson,
Bronstein & Mrose
ATTORNEYS Jan. 16, 1968  E. LAIMINS  3,363,456
CANTILEVER BEAM TRANSDUCERS
Filed Feb. 2, 1965  2 Sheets-Sheet 2

United States Patent Office 3,363,456
Patented Jan. 16, 1968

3,363,456
CANTILEVER BEAM TRANSDUCERS
Eric Laimins, Cambridge, Mass., assignor to BLH Electronics, Inc., Waltham, Mass., a corporation of Delaware
Filed Feb. 2, 1965, Ser. No. 429,719
8 Claims. (Cl. 73—141)

ABSTRACT OF THE DISCLOSURE

A strain-responsive force transducer including a cantilever-beam member equipped with strain gages is held fixed at one end and has its movable end coupled with a force-applying member by way of an inflexible member, the inflexible member being connected to the movable end through a first flexible interconnection and to the force-applying member through a second flexible interconnection spaced from the first in the same direction as that of the intended direction of movements of the force-applying member.

---

The present invention relates to improvements in electrical strain gage transducers of the cantilever beam type, and, in one particular aspect, to novel and improved diaphragm-actuated pressure transducers wherein double cantilever-beam elements are uniquely linked to a force-applying member in a manner promoting accurate responses to forces applied in either of two directions and minimizing tendencies toward permanent structural deformations.

It has long been well known to measure elastic strains resulting from loading-induced stresses of elements such as beams, columns, diaphragms, and the like, using electrical strain gages for the accurate translations of the exhibited strains into convenient related variations in electrical impedances. Wire, foil and semiconductor type gages find widespread application in such devices and well lend themselves to manufacture in highly miniaturized forms suitable for installation upon small surface areas of such sensing elements. Cantilever beams have proven to be a highly advantageous basis for design of sensing elements, and are particularly useful in the construction of certain pressure-sensitive transducers wherein they are actuated by diaphragms or bellows. However, the arcuate deflections of the movable end of such a beam results in different effective moment arms, with consequent undesirable varying relationships between the applied forces and the strains measured by gages affixed to the beam sides, and with consequent undesirable extraneous loadings of the force-applying member and of the beam. Various forms of linkages between the force-applying member and movable beam end have been suggested in efforts to overcome these problems; however these have generally been of relatively costly manufacture, have not readily lent themselves to precise control of the beam deflection characteristics, and have not been well suited to bi-directional force measurements.

Accordingly, it is one of the objects of the present invention to provide novel and improved beam-type transducers of low-cost manufacture which avoid undesirable effects of moment arm variations, provide extended ranges of responses proportional to input forces, and operate in the same highly effective manner under conditions of deflection in different directions.

Another object is to provide high-precision bi-directional double cantilever load transducers having unusual mechanical niceties which promote economical manufacture and precise regulation of deflection characteristics.

Further, it is an object to provide improved differential pressure transducers wherein a pair of pressure-responsive diaphragms actuate double cantilever sensing elements having unique flexures which respond safely to forces applied in either of two directions and which circumvent tendencies towrad secondary distortions of the diaphragms.

By way of a summary account of practice of this invention in one of its aspects, a pair of cantilever beam members are joined in an end-to-end relationship with one another via a double flexure arrangement which includes, on each side of a stiff center member, a pair of spaced parallel slots which are also parallel with the axis along which the measured forces are to be applied to the center member. Each of the two slots in each pair opens toward a different one of the two spaced sides of the slotted member which lie in planes normal to the force axis, and each of these slots is closed very near the other of these sides and thereby forms a relatively thin flexure site. Intermediate each pair of these spaced slots, the intervening material is essentially stiff and inflexible, as compared with the stiffness of the two flexure sites. When forces are applied to the center member in either direction along the force axis, bending occurs only at the flexure sites, and the stiff material between each pair of slots undergoes accommodating rotation permitting the center member to move axially while the movable beam ends deflect arcuately because they are relatively unrestrained. In this process, one of the slots in each pair is partly closed and the other is partly opened. Strain gages applied to upper and lower surfaces of the cantilever beam elements, nearer their fixedly-supported ends, yield electrical measurement data accurately characterizing the differentials of pressures experienced by two diaphragms acting on opposite sides of the center member of the beam assembly.

Although the features of this invention which are considered to be novel are set forth in the appended claims, further details as to preferred practices and as to the further objects and features thereof may be most readily comprehended through reference to the following description taken in connection with the accompanying drawings, wherein:

FIGURE 1 depicts, in an end view, a differential pressure transducer unit in which teachings of the present invention may be practiced;

FIGURE 2 is a side view of the transducer unit appearing in FIGURE 1;

Figure 3:
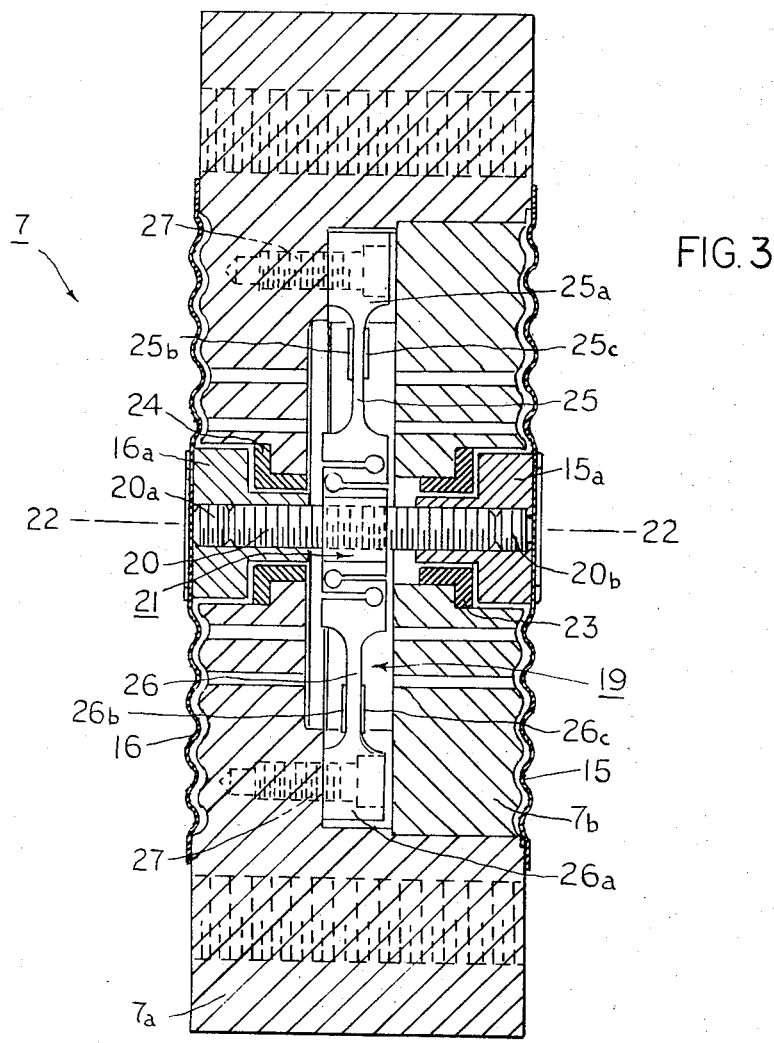
Figure 5:
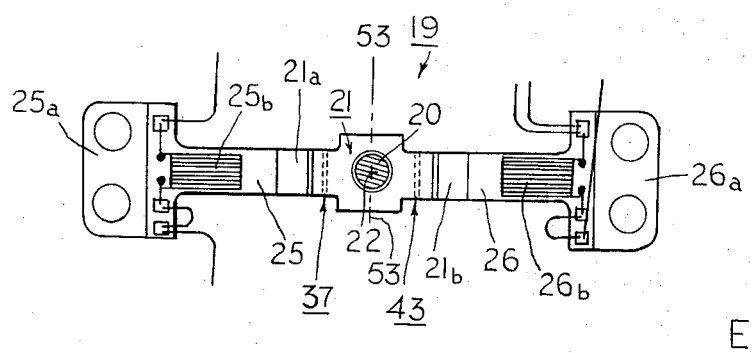

FIGURE 3 provides a partly cross-sectioned and enlarged end view of a differential pressure transducer capsule designed for use with the unit illustrated in FIGURES 1 and 2;

FIGURE 4 is an enlargement of an improved double cantilever transducer element, expressing teachings of this invention, such as that embodied in the capsule of FIGURE 3; and FIGURE 5 represents the same transfer element in a plan view and with electrical resistance strain gages affixed to the beam surfaces.

The differential pressure cell 6 portrayed in FIGURES 1 and 2 includes three principal sub-assemblies: a central transducer capsule 7; and two end caps 8 and 9, which are secured to the opposite sides of the central capsule by bolts 8a and 9a and are sealed in fluid-tight relationship therewith by gaskets 8b and 9b. A housing 10, for associate electrical impedances and wiring, is fixed with the central capsule unit and mounts a connector 11 for an electrical cable 12. Each of the end caps 8 and 9 includes at least one port 13 and 14, respectively, through which pressures at remote measurement sites may be piped and communicated to different pressure-responsive diaphragms 15 and 16 (FIGURES 2 and 3). These end caps are relieved on their interiors, as designated by dashed linework 17 and 18, to form cavities alongside the diaphragms which will be at the different fluid pressures being monitored.

The two diaphragms 15 and 16 respond to the pressures existing in these cavities by producing related deflections of the double cantilever beam assembly 19 (FIGURE 3). For the latter purposes, the two substantially parallel diaphragms are joined at their centers by a transversely-extending screw 20 which is threaded into the rigid central hub portion 21 of the beam assembly as well as being threaded into the members 15a and 16a fixed at the centers of these diaphragms. Locking set screws 20a and 20b prevent accidental disturbance of a pre-set adjustment of the diaphragm centers in relation to one another and in relation to the intermediate beam assembly. Fabrication of the capsule unit is facilitated by fashioning its framework in two parts 7a and 7b which nest together with the elongated beam assembly 19 in a cavity between them, there being sufficient clearance to accommodate limited diaphragm and beam assembly movements along the central axis 22—22. The annular corrugated diaphragms are sealed with framework part 7a about their outer peripheries, and with the central members 15a and 16a about their inner peripheries. Complementary corrugations on parts 7a and 7b limit deflection of and thus prevent damage to the diaphragms in the event of abnormal pressure and resulting deflections, and inserts 23 and 24 serve as mechanical stops limiting the permissible axial movements of members 15a and 16a. Rigid outer extremities 25a and 26a of the two bending-beam sections 25 and 26, respectively, are fixed securely with framework part 7a by bolts 27. Strain gages 25b and 25c are affixed to opposite sides of thin beam section 25, and like gages 26b and 26c are affixed to opposite sides of the other beam section 26.

The deflected ends 25d and 26d (FIGURE 4) of the two metal beam sections arrayed end-to-end are integral with rigid elements 21a and 21b, respectively, which are in turn integral with the hub portion 21, although by way of special intervening flexure arrangements 28 and 29. Each of these two flexure arrangements is developed by machining a pair of controlled-depth slots transversely in relation to the direction of elongation of the beam sections and generally parallel with the force axis 22—22, while leaving an intermediate section of sufficient width to remain substantially rigid and inflexible. Each of the two slots in each pair is cut in a different direction, one from the top planar surface 30 and the other from the bottom planar surface 31 and extends toward but not quite through to the opposite surface. In the case of flexure arrangement 28, for example, the inner slot 32 extends from the top surface 30 toward but just short of the bottom surface 31, and the outer slot 33 extends from the bottom surface 31 toward but just short of the top surface 30. Reamed holes 34 and 35 of circular cross-section are formed at the bottoms of the slots 32 and 33, to avoid excessive stress concentrations at the two sites 36 and 37, respectively, where the metal has been reduced to a predetermined small thickness 38 and where flexures may occur as beam deflections are caused by pressure-induced forces acting on the hub portion 21. In the case of flexure 29, the inner slot 39 extends from the top surface 30 toward but just short of the bottom surface 31, and the outer slot 40 extends from the bottom surface 31 toward but just short of the top surface 30. Reamed holes 41 and 42 are formed at the closed ends of these slots, and serve the same functions as holes 34 and 35 and regulate the properties of the two flexures at sites 43 and 44. Intermediate sections 45 and 46, between slot pairs 32–33 and 39–40, respectively, are of a width 47 insuring that they will remain stiff and cannot buckle under compressive loading conditions such as can occur when the hub portion is forced upwardly (FIGURE 4) along axis 22—22. Precise control of the flexural characteristics at the pairs of flexure sites 36–37 and 43–44 is readily attained by removing metal from the surfaces 30 and 31 at these sites, to regulate the material thicknesses 38 and 48. The distances 49 of the outer flexure sites, and 50, of the inner flexure sites, from force axis 22—22 are governed by the lateral locations of the reamed holes 34–35 and 41 and 42. Although conservation of space dictates that the slots themselves be narrow, these may in other cases be formed in greater width and without necessity for the enlarged reamed holes; the intermediate sections 45 and 46 must remain relatively thick and non-buckling, however, such that the device will be bi-directional in operation, without risk that permanent deformations will occur in these sections.

Dashed linework 51 and 52 outlines fragments of the deflected assembly and thus characterizes the upward and downward flexures occurring during pressure-responsive actuations of the assembly. The upward deflection, resulting from higher pressures being exerted upon diaphragm 16, tends to cause the beam section 25 and flexure arrangement 28 to move toward the positions outlined by linework 51. In this process, the beam section 25 bends, and its associated strain gages (25b and 25c, in FIGURES 3 and 5) exhibit related changes in electrical resistance. However, the stiff hub portion 21, the rigid end element 21a, and the substantially inflexible intermediate section 45, cannot deform significantly, and the beam section deflection is accommodated solely by the flexures occurring at the two thin flexure sites 36 and 37. Slot 33 closes somewhat, and slot 32 opens, while the section 45 intermediate these flexure sites turns slightly as it is raised. Corresponding actions are developed on the opposite side of the hub portion, to accommodate the like upward deflection of the other beam section, 26. Downward deflection, induced by higher pressures existing on the outer surface of diaphragm 15, tends to cause the beam section 26 and flexure arrangement 29 to move toward the positions outlined by dashed linework 52. In this process, the beam section 26 bends, and its associated strain gages (26b and 26c, in FIGURES 3 and 5) exhibit related changes in electrical resistance. Deflections are accommodated solely by the flexures occurring at the two thin flexure sites 43 and 44. Slot 39 closes somewhat, and the slot 40 opens, while the section 46 intermediate these flexure sites turns slightly as it is lowered. Corresponding actions are developed on the opposite side of hub portion 21, to facilitate the like downward deflection of the other beam section, 25. The moment arms for the beam sections remain substantially constant, and no undesirable frictional restraints are involved. In a symmetrical design, hub portion 21 experiences no net lateral thrusts or angular twists as the result of the beam section deflections, and the associated diaphragms are thus isolated from undesirable secondary deformations which might otherwise occur.

The thicknesses 38 and 48 of the material at the inner and outer flexure sites are preferably made the same, and the width of material at these sites is preferably the same, such that the flexural effects at the outer flexure sites will be substantially identical and shared equally between them, as will also the flexural effects at the inner flexure sites. The inner and outer flexure sites, being at the different distances 50 and 49, respectively, from the force axis 22—22, may be caused to share flexural effects equally by making the thickness 48 of the inner flexure sites less than the thickness 38 at the outer flexure sites, these being in inverse proportion to the distances 50 and 49 from the force axis. The ease with which the deflection characteristics can be regulated, for both directions of deflection, is highly advantageous in that the assembly can readily be made to exhibit deflection characteristics which compensate for diaphragm deflection characteristics which may not be in precisely the desired form.

Each of the flexure arrangements between the force-applying hub and the arcuately-movable ends of the beam sections includes at least two flexible interconnections (such as those at sites 36–37 and 43–44), one between the hub and an inflexible member (such as the members 45 and 46), and the other between the inflexible member and the movable end of one of the beam sections. These two flexible interconnections are preferably disposed at different radial distances (49 and 50) from the force-applying axis, but they are in any event necessarily disposed in spaced relationship to one another in a different direction which is substantially transverse to a radius from the force-applying axis. As shown in FIGURE 4, for example, the two flexible interconnections in each pair (pairs of interconnections 36–37 and 43–44) are in spaced relationship to one another in a direction parallel with the force-applying axis 22—22. In an alternative arrangement, wherein the hub member 21 is instead moved angularly about a force axis 53—53 (FIGURES 4 and 5) normal to axis 22—22, the interconnections are in spaced relationship to one another in a direction extending substantially in the direction of angular movement (which is also substantially transverse to a radius from the force axis). The aforementioned spaced relationships are necessary in that they permit the inflexible intermediate members, 45 and 46, to turn somewhat and thereby accommodate the increases in separations between the movable beam ends and hub which occur during deflections. The spacing dimensions may vary, of course, depending upon the extents to which the hub and movable beam ends must be relatively movable in given designs, and upon the amounts of flexure which are to be accommodated at the flexure sites. Although two flexible interconnections and two slots have been illustrated in connection with each of the flexure arrangements, it should be evident that more than two may be employed in certain designs. In such cases, one or more further inflexible members, like members 45 and 46, are used also. By way of example, the flexure arrangement 28 in FIGURE 4 may be expanded by forming a further slot, like slot 32, on the other (radially outer) side of slot 33, leaving sufficient space so that the material between the new slot and the slot 33 will be stiff and unbending and will there form another intermediate member like member 45, with the thin flexure site along the bottom surface 31. The flexing at the new site may then share some of the flexure characteristics assumed solely at flexure site 37 of the illustrated two-slot design.

When the hub portion 21 is arranged to be deflected angularly about axis 53—53, rather than linearly along axis 22—22, then the one or more gaged cantilever beam sections serve as convenient means for measuring torque and angular deflections. Mechanical advantages may of course be realized by applying forces about the axis 53—53 through lever arms and the like.

The electrical strain gage responses may be translated into electrical measurements through use of conventional instrumentation networks, such as those involving Wheatstone bridges and the like.

It should be understood that the embodiments and practices described and portrayed herein have been presented by way of disclosure, rather than limitation, and that various modifications, substitutions and combinations may be effected without departure from the spirit and scope of this invention in its broader aspects.

What I claim as new and desire to secure by Letters Patent of the United States is:

1. Strain-responsive apparatus comprising a support, a force-applying member, means mounting said force-applying member for movement along an axis which is fixed in relation to said support, at least two flexible cantilever beam members each fixed at one end to said support, flexure arrangements for joining the other relatively movtermediate section spaced between said force-applying member, strain gage means responsive to strains exhibited by at least one of said beam members, each of the flexure arrangements including at least one substantially stiff intermediate section spaced between said forcce-applying member and said relatively movable end of the beam member, and at least a pair of flexible integral interconnections one connecting said force-applying member with said intermediate section and the other connecting said intermediate section with said relatively movable end of the beam member, said flexible interconnections being spaced at different distances radially from said axis and also in a direction substantially transverse to a radius from said axis, whereby, upon movement of said force-applying member relative to said support and along said axis, said interconnections flex and said stiff intermediate sections are turned to accommodate arcuate movements of the relatively movable ends of said beam members.

2. Strain-responsive apparatus comprising a support, a force-applying member, means mounting said force-applying member for movement along an axis which is fixed in relation to said support, a flexible cantilever beam member fixed at one end to said support, a flexure arrangement joining the other relatively movable end with said force-applying member, strain gage means responsive to strains exhibited by said beam member, said flexure arrangement including a relatively inflexible member, a first flexible interconnection connecting said inflexible member with said relatively movable end of said beam member, and at least a second flexible interconnection connecting said inflexible member with said force-applying member, said first and second interconnections being spaced from one another in a direction which is substantially transverse to a radius from said axis and is also substantially in the direction of movements of said force-applying member.

3. Strain-responsive apparatus as set forth in claim 2 wherein said direction is substantially parallel to said axis and wherein said first and second interconnections are spaced from one another in a substantially radial direction from said axis.

4. Strain-responsive apparatus as set forth in claim 2 wherein said beam member, said first and second flexible interconnections, said inflexible member, and said force-applying member are integral with one another and formed from the same stock.

5. Strain-responsive apparatus as set forth in claim 4, wherein said inflexible member is spaced from said force-applying member by a first open-ended slot closed at one end by said second flexible interconnection, wherein said relatively movable end of said beam member is integral with a relatively inflexible element, and wherein said inflexible member is spaced from said inflexible element by a second open-ended slot closed at one end by said first flexible interconnection, said slots being substantially parallel with one another and extending substantially transversely to the longitudinal axis of said beam member.

6. Strain-responsive apparatus comprising a support, an elongated transducer member fixed with said support at the opposite ends thereof and having a rectangularly cross-sectional element with a relatively movable central portion and flexure elements, said flexure elements being joined with said ends by flexible cantilever beam sections one on each side of said central portion, means for applying forces to said central portion and moving said central portion along an axis fixed in relation to said support, electrical strain gage means responsive to strains exhibited by said beam sections, said flexure elements being disposed one on each side of said axis and accommodating deflections of said flexible beam sections upon movement of said central portion along said axis, each of said flexure elements being formed by a pair of spaced slots extending from a different side of the rectangularly cross-sectioned element toward but just sufficiently short of the opposite side thereof to leave a thin flexible connection at that site, the two slots of each flexure element being spaced by a distance which leaves a substantially inflexible section of said element between the slots, whereby flexure in the two flexible connections in each of said flexure elements accommodates said deflections.

7. Strain-responsive apparatus as set forth in claim 6 wherein said central portion and beam sections of said transducer member are integral with one another, and wherein all of the slots are substantially parallel to one another and extend in a direction substantially transverse to the direction of elongation of said transducer member.

8. Strain-responsive apparatus as set forth in claim 7 wherein each of said pair of slots opens toward a different side of one of said flexure elements, and wherein the flexible connections of said flexure elements nearer said axis are both at substantially the same distance from said axis and the flexible connections of said flexure elements further from said axis are both at substantially the same distance from said axis.

References Cited
UNITED STATES PATENTS

| | | | |
|---|---|---|---|
| 3,135,112 | 6/1964 | Farley | 73—141 |
| 3,184,964 | 5/1965 | Hedrick et al. | 73—141 |
| 3,186,220 | 6/1965 | Flinth | 73—141 |
| 3,272,006 | 9/1966 | Eckard | 73—141 |

RICHARD C. QUEISSER, *Primary Examiner.*

J. J. GILL, *Examiner.*

C. A. RUEHL, *Assistant Examiner.*